(12) United States Patent  
Smith

(10) Patent No.: US 6,484,714 B1
(45) Date of Patent: Nov. 26, 2002

(54) HIGH TEMPERATURE FIREPLACE GRATE INCLUDING ROOM HEATING TRANSFER TUBES

(76) Inventor: Richard D. Smith, 2415 S. Court, Palo Alto, CA (US) 94301

( * ) Notice: Subject to any disclaimer, the term of this patent is extended or adjusted under 35 U.S.C. 154(b) by 0 days.

(21) Appl. No.: 10/039,457

(22) Filed: Dec. 31, 2001

(51) Int. Cl.[7] .......................... F24B 1/195; F24B 1/193; F24B 7/04; F24H 3/08
(52) U.S. Cl. ...................... 126/525; 126/522; 126/527; 126/77; 126/533; 126/163 R; 126/540
(58) Field of Search ................................ 126/552, 522, 126/524, 525, 526, 527, 540, 163 R, 77, 533, 152 B, 152 R; D23/399; 110/300, 267, 268

(56) References Cited

U.S. PATENT DOCUMENTS

| 92,526 | A | * | 7/1869 | Hamilton | 122/305 |
|---|---|---|---|---|---|
| 114,280 | A | * | 5/1871 | Farris | 122/371 |
| 1,191,848 | A | * | 7/1916 | Stout | 165/93 |
| 3,905,351 | A | * | 9/1975 | Hatfield et al. | 126/522 |
| 3,942,509 | A | * | 3/1976 | Sasser | 126/522 |
| 4,078,542 | A | * | 3/1978 | Young et al. | 126/508 |
| 4,122,825 | A | * | 10/1978 | Slate | 126/522 |
| 4,149,517 | A | * | 4/1979 | Horwinski | 126/514 |
| 4,206,875 | A | * | 6/1980 | Grasso | 110/326 |
| 4,310,303 | A | * | 1/1982 | Collier | 126/91 A |
| 4,334,517 | A | * | 6/1982 | Sweitzer | 126/163 R |
| 4,349,009 | A | * | 9/1982 | Patterson et al. | 126/518 |
| 4,445,497 | A | * | 5/1984 | Kilday | 126/152 B |
| 4,515,147 | A | * | 5/1985 | Van Grouw et al. | 126/163 R |
| 5,850,830 | A | * | 12/1998 | Smith | 126/152 R |
| 5,934,270 | A | * | 8/1999 | Kim | 126/524 |

FOREIGN PATENT DOCUMENTS

FR 2 573 517 * 5/1986 .................. 126/524

* cited by examiner

Primary Examiner—Carl D. Price
(74) Attorney, Agent, or Firm—Serge Abend

(57) ABSTRACT

An improved grate for burning solid fuel having a support for the fuel, a blower for transporting air through the support, a multiplicity of orifices jets uniformly distributed across the entire area of the grate and directed through the support generally upwardly to transport preheated air toward the lower surface of the solid fuel. A trough located immediately below the support, and in close proximity to the lower surface of the solid fuel, for collecting a layer of glowing coals and providing a combustion zone in troughs between the supports. Internal air transport tubes within the support provide passageways for air to flow from the blower out of the grate. A low thermal mass heat reflector may be used with the grate for absorbing radiant energy from the combustion zone and reradiating thermal energy over the fireplace grate and out of the fireplace.

18 Claims, 4 Drawing Sheets

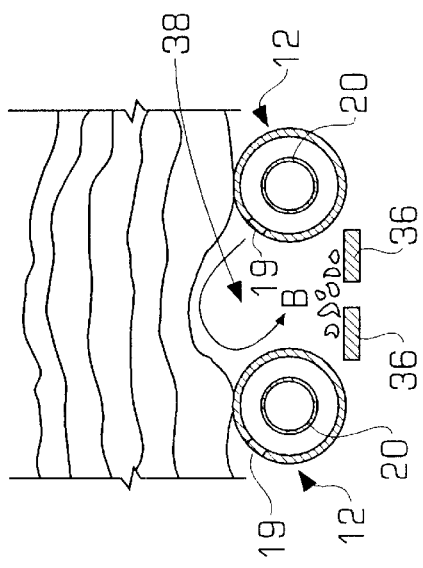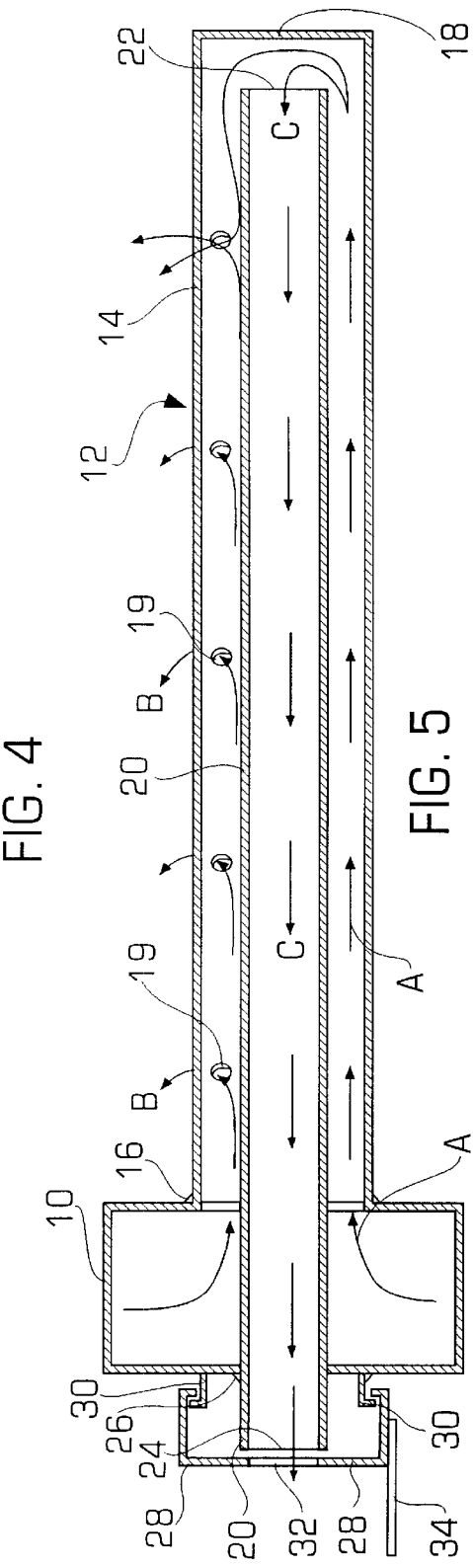

HIGH TEMPERATURE FIREPLACE GRATE INCLUDING ROOM HEATING TRANSFER TUBES

FIELD OF THE INVENTION

The present invention is directed to an improved fireplace grate for burning solid fuel cleanly and efficiently in a fireplace. It is an improvement over the inventions of my previous patents U.S. Pat. Nos. 4,515,147 and 5,850,830, and is designed to provide a positive flow of heated air into the room from the fireplace.

BACKGROUND OF THE INVENTION

As all areas of the nation strive for cleaner air, the focus of correction is shifting from primary industrial and vehicular sources of pollution to secondary sources of pollution, such as wood burning fireplaces. In many residential areas, a complete ban on wood burning fireplaces is being proposed. In certain geographical areas where the topography is such that pollutants collect and are not readily blown away, such as Denver, Colo. and Beaver Creek, Colo., restrictions on wood burning fireplaces have now been in place for many years.

Pollution is caused because fireplaces do not burn all of the fuel vapor escaping from the burning wood and these fuel vapors are transported up the chimney into the atmosphere. For clean combustion, thorough mixing of the air and fuel vapor is required to achieve intimate contact between oxygen and fuel molecules. In addition, the mixture must be at a temperature high enough to cause the reaction to occur and sufficient time must be available to allow the reaction to go to completion. The reaction rate increases exponentially with increasing temperature so it is highly desirable to generate high temperatures to complete the reactions in the shortest time possible before the reactants have escaped from the hot combustion zone of the fire and have been cooled below their ignition temperature by dilution with excess air or heat transfer to the surroundings.

Existing fireplaces use natural draft to bring oxygen to the burning surfaces of the wood as well as to cause mixing of the fuel vapor and oxygen in the combustion zone. Natural draft forces result from the buoyancy of heated air or combustion gas, bringing new air to the combustion zone. Unfortunately, these buoyant forces are extremely weak (normally less than 0.01 inches of water gage (IWG)) and result in very low velocities and turbulence levels over the burning surface. These low velocities limit the rate at which combustion can occur on the burning surface of the wood and also limit the mixing of the volatile fuel vapor with the combustion air. Because of the limited combustion rate on the wood surface and limited combustion of the volatiles in the combustion zone, temperatures in the normal combustion zone in existing fireplaces are usually too low to allow complete combustion of the fuel vapors before they escape from the combustion zone and are cooled still further.

A further problem arises because of the coupling of the fire with the natural draft. Wood in a fireplace does not burn with uniform intensity over its entire surface but rather has zones where it burns with high intensity and zones where very little combustion occurs. The zones with high intensity create the most buoyant forces and hence, the most intense local draft. The hottest part of the fire tends to become even hotter. Unfortunately, the cooler part of the fire, which badly needs a stronger draft to burn hotter and cleaner, is unable to generate that draft so it tends to cool further and pollute more. Near the end of a fireplace fire, when the hottest zones of the fire have all burned out, little draft is left to burn the smoldering logs yet remaining and to prevent large quantities of unburned volatiles from escaping into the atmosphere.

Measurements taken in a conventional open fireplace indicate that the combustion zone in which adequate combustion temperatures may be achieved is localized to within a few inches of the burning wood and often is found only in the interstices between logs where the radiated heat from the burning surface is retained in a cavity. Fireplaces burn with large amounts of excess air (2000% excess air was measured in one test) that dilute and cool the combustion gas below combustion temperature shortly after it leaves the surface of the fuel. Temperatures measured twelve inches above the fire in a fireplace are approximately 200 F, well below the nominal 1000 F needed to initiate the combustion reactions. Hence, for fireplaces, the only opportunity to achieve clean combustion by burning the volatile vapors exists while the vapors are in the combustion zone, immediately adjacent to the surface of the wood.

The reflecting surfaces in most fireplaces are either brick, stone or metal. These have high thermal mass and absorb heat for a considerable time after the fire is underway, thereby actually cooling the fire. Only after they have been thoroughly heated do they radiate any significant heat energy back into the fire. Practically speaking, they do virtually nothing to enhance the efficient burning of the fire and are detrimental to it during the early stages thereof.

In U.S. Pat. No. 4,515,147 (fully incorporated herein by reference) granted to me and Samuel J. Van Grouw, entitled "Clean Burning Grate for Fireplaces and Wood Stoves" we have taught a fireplace grate which provides a uniform supply of forced air to the entire lower surface of the burning logs and the maintenance of a combustion zone provided by a bed of hot coals supported adjacent to the lower surface of the burning logs. However, even this highly efficient combustion enhancing device could be improved by an increase in combustion efficiency which would result in further pollution reduction and heating of the room in which the fireplace is located.

In U.S. Pat. No. 5,850,830 (fully incorporated herein by reference) granted to me and entitled "Heat Reflector for use with Fireplace Grate for High Temperature Combustion", there is disclosed a modification to the design of my U.S. Pat. No. 4,515,147 patent by means of the addition of a low thermal mass radiant energy heat reflector. This design provides a two-fold improvement over my '147 design. Namely, radiant energy is directed by a reflector into the combustion zone, increasing combustion efficiency, thereby resulting in further pollution reduction, and radiant energy is directed by the reflector into the room.

SUMMARY OF THE INVENTION

When burning a wood fire in a fireplace, the desired result is to obtain a pleasant appearance and provide a cheery warmth to the room in which the fireplace is located, while minimizing the escape of pollutants into the atmosphere. To this end, the present invention is an improvement over the fireplace grates of my prior designs as it is designed to propel heated air into the room. It is intended that the present invention may be used with or without the low thermal mass radiant energy heat reflector of my '830 patent.

In the present embodiment, as well as in my prior designs, the primary objective of the present invention is to reduce the pollution from wood burning fireplaces. This is achieved by blowing air directly onto the fuel, thereby incresing the combustion temperature. Both designs offer the benefits of easy starting, better aesthetics from the fire, near maintenance free operation of the fire, reduction in the consumption of wood by eliminating the need for a second layer of wood on the fire, burning all logs completely to the end of the fire and burning damp wood or difficult species of wood easily. Also, because of the high temperatures existing in the combustion zone, radiant heat transfer into the room is greatly increased, as compared with conventional fireplace grates. Additionally, the low thermal mass heat reflector will reradiate heat into the room.

It is the primary objective of the present invention to obtain all the advantages of my prior designs and additionally providing a mechanism for blowing heated air into the room.

These and other features and advantages of the present invention will become more apparent upon a perusal of the following description wherein similar characters of reference refer to similar parts in each of the several views.

BRIEF DESCRIPTION OF THE DRAWINGS

FIG. 4 is a sectional view taken substantially along line 4—4 of FIG. 3 showing the air flow pattern within the combustion zone, FIG. 5 is a side sectional view of a single tube of the improved fireplace grate.

DETAILED DESCRIPTION OF THE DRAWINGS

Figure 1:
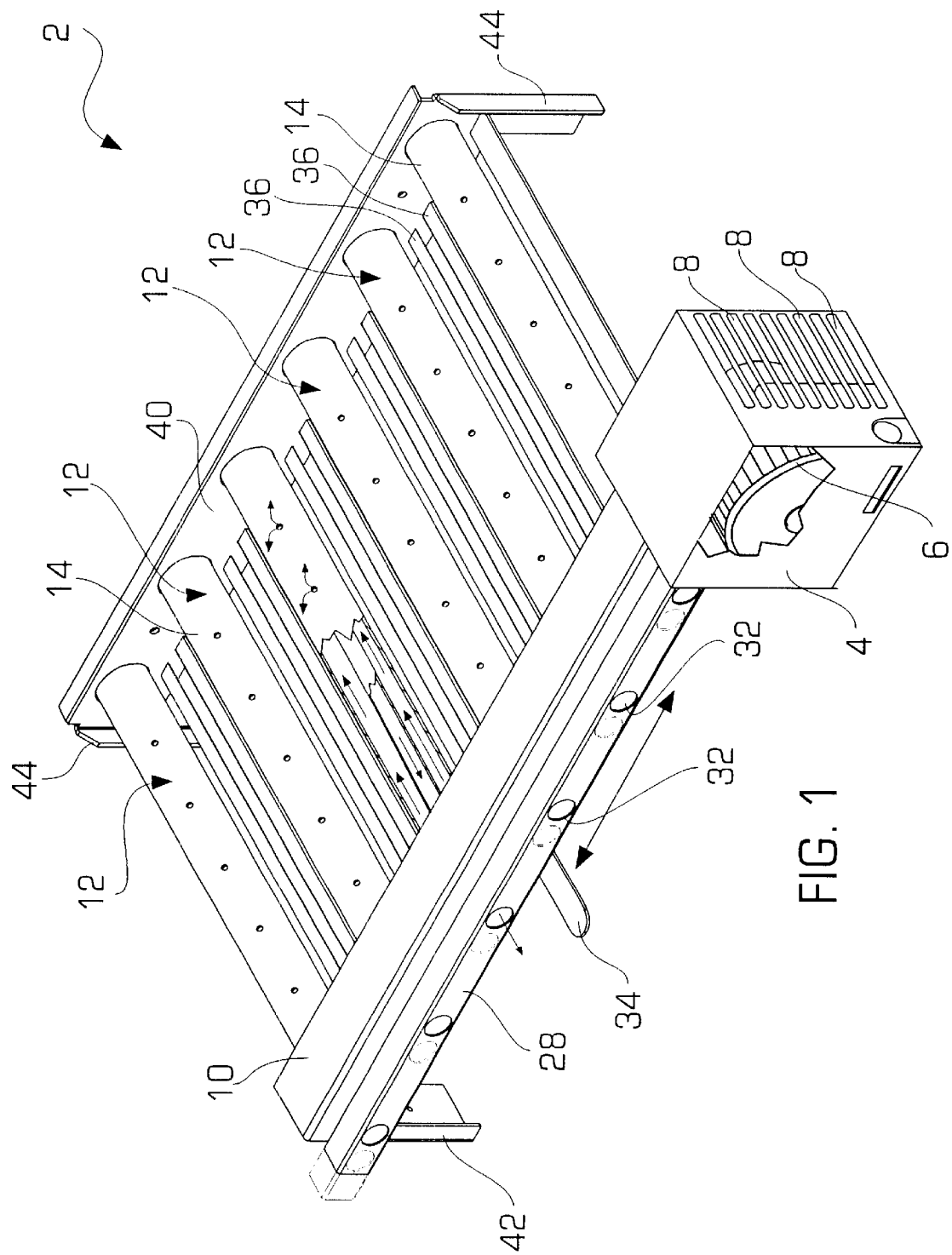
FIG. 1 is a perspective view of the improved fireplace grate of the present invention.

Turning now to the drawings, in FIG. 1 there is shown an embodiment of the improved clean burning grate 2 of the present invention. This grate is intended to be placed in a fireplace, so that in use it enhances the combustion efficiency of wood burned thereon and blows heated air into the room in which it is placed. The entire grate 2, including a blower 4 and its motor, which are located in blower housing 6, is intended to be placed within the fireplace for minimum intrusion on the aesthetics of the fireplace. The blower and blower motor are protected from thermal radiation and convection from the fire by the heat shielding housing and are further cooled, in operation, by the flow of cooler ambient air drawn thereover during normal operation through air inlets 8.

The blower is provided with a variable speed controller so that air may be supplied to the fuel at low pressures, in the range from about 0.1 to 1.0 inches of water gage (IWG). For easy starting and quick ignition when new logs are added to the fire, a high speed setting may be selected on the blower's variable speed controller. Under normal, steady-state operation, the blower produces about 0.1 IWG, but for starting and quick ignition it may be adjusted to produce about 0.2 to 0.6 IWG. This large amount of air at high jet velocities produces high burning rates and provides a fully lighted fire within three minutes from a cold start. Thus, compared to conventional wood fires with a natural draft, the improved fireplace grate provides much easier starting, always a problem when building a wood fire.

A manifold 10 is secured to the motor housing 4 for receiving air flow propelled by blower 6. In turn, the manifold supports a multiplicity of dual wall grate tubes 12 (as best seen in FIG. 5), each including an outer tube 14 having an open end secured to (as by weldment 16) and in alignment with a complementary opening in the manifold, and an opposite, closed end 18. A multiplicity of orifices 19 are spaced over the entire upper area of the outer tube 14 in order to produce air jets directed at the fuel. An inner tube 20, coaxial with the outer tube 14, is open at both ends 22 and 24, and is held in position by being affixed to the manifold, as by weldment 26. A baffle plate 28 supported by the manifold, on a series of lugs 30, so as to be closely spaced from the open ends 24 of inner tubes 20 and to be capable of longitudinal movement parallel to the axis of manifold 10. A plurality of openings 32. These openings are coequal in number to the number of inner tubes and coequally spaced with the axial center-to-center spacing of the inner tubes. A handle 34 is secured to the baffle plate for moving the baffle plate longitudinally with respect to the manifold, so that the openings 32 may be positioned in or out of alignment with open ends 22 of inner tubes 20, as illustrated by phantom lines in FIG. 1.

Coals retaining strips 36 are placed between and below adjacent grate tubes 12 for catching hot glowing coals which detach from the fuel and for retaining these coals between the grate bars in intimate contact with the lower surface of the fuel.

Figure 2:
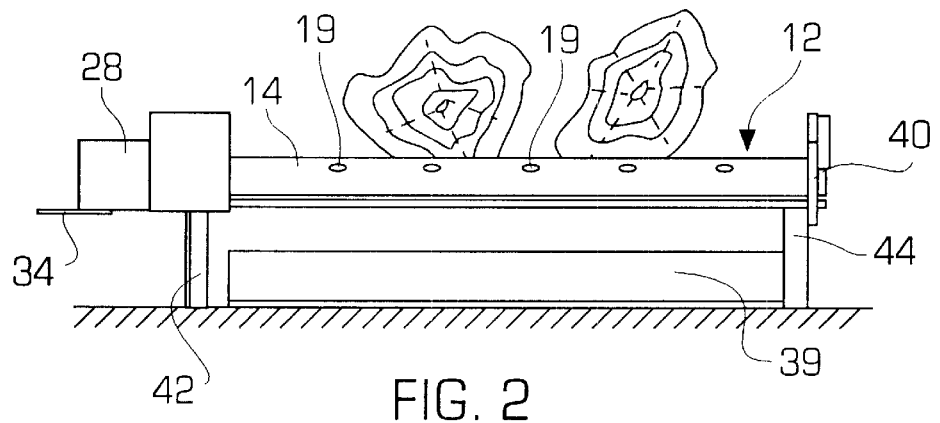
FIG. 2 is a side elevational view of the improved fireplace grate illustrating two logs on the grate.

Thus, the glowing coals are allowed to reside in the trough 38 (see FIG. 4) defined by adjacent grate tubes 12 and the coals retaining strips 36. Clearance is provided between adjacent strips 36 and between each strip and its adjacent grate tube 12 in order to allow ash and spent coals to drop into an ash pan 39 (shown in FIG. 2) when their size has been reduced to approximately ⅜ inch diameter. Collectively, the several troughs 38 provide an intense combustion zone, located between the upper surface of the bed of coals and the lower surface of the fuel, over the entire area of the grate, for heating the grate tubes and the air passing through them.

A back support plate 40 supports the closed ends of the grate tubes 12, and front legs 42 connected to manifold 10 and rear legs 44 connected to the back support plate elevate the grate structure above the floor of the fireplace to accommodate and ash pan 39. The construction of the grate must accommodate varying rates of expansion and contraction for its different elements which are subjected to uneven temperatures during normal operation, in order to prevent the uneven temperatures from causing thermal stresses which may damage the grate. For example, different thermal conditions apply during start up, shut down and in normal operation. Also, different thermal gradients exist depending on the location of elements relative to the location of the fire. It should be apparent that the two outboard outer grate tubes which will only have a trough 38 on one side thereof, will always remain the coolest. For this reason, I have found that it may not be desirable to utilize the unique dual tube structure in these outer grate tubes and these may be configured solely with the single, orificed tube, as shown in my '147 patent. These normally cooler outboard grate tubes are welded to the back support plate 40 to provide structural rigidity to the grate. Conversely, the inboard outer grate tubes rest in openings in the back structural support which are large enough to enable the tubes to move freely, as required. All of the coals retaining strips are welded to the manifold and rest in rectangular openings in the back support plate 44 so as to be free to individually expand and contract, as necessary.

Figure 3:
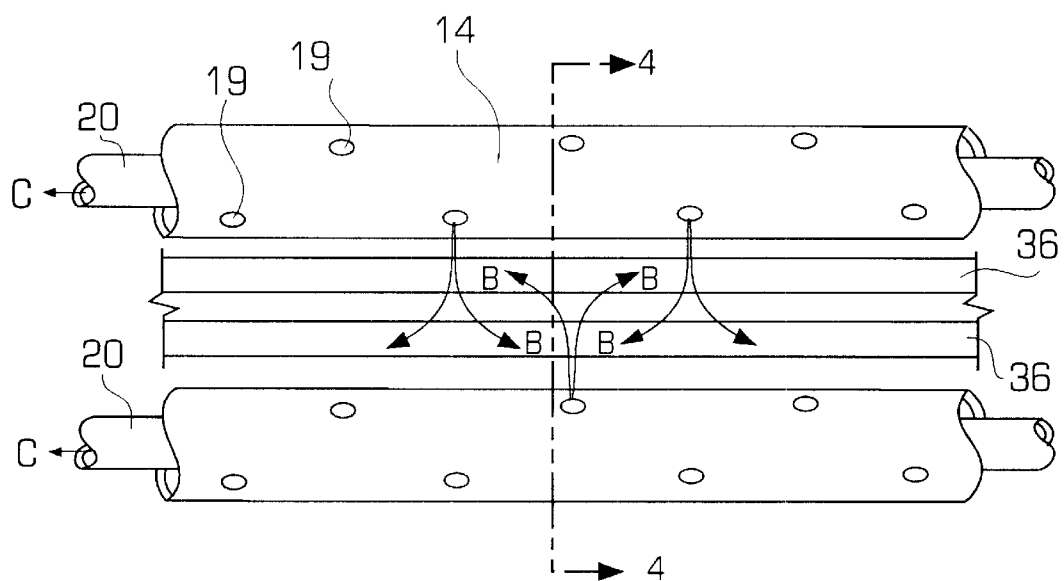
FIG. 3 is a partial top view showing the relationship of the orifices and the air flow pattern created thereby.

Blower 6 forces air through manifold 10 and then into each grate tube 12, as illustrated by arrows A. At nominal conditions the blower supplies air in the range from 6 to 10 SCFM of air to a small fireplace. The air passes between the outer and inner grate tube and initially exits from the orifices 19 and is directed at the undersurface of the logs (illustrated in FIG. 2) resting on the grate tubes. The orifices are preferably about 5/32 inch in diameter (larger than 3/32 inch and smaller than 3/8 inch in diameter) and are generally directed upwardly with an adequate horizontal component, to provide a sweeping flow of air over the major portion of the lower surfaces of the fuel. The orifices should be oriented from 0 to 60 degrees from the vertical, with a preferred angle being about 45 degrees (as best seen in FIG. 4). The orifice pattern is staggered between grate tubes to assure an optimum flow of air over the undersurface of the entire log and to establish a turbulent air flow pattern as indicated by the arrows B in FIGS. 3 and 4. The excess air then passes into the inner tubes 20 (indicated by arrows C) through open ends 22 and and finally exits into the room. Of course, air may only pass into the room when the baffle plate openings 32 are aligned with the open ends 24 of the inner tubes.

Preferably, all parts subjected to intense heat are made from 304 stainless steel to resist oxidation at elevated temperatures above 1000 F, ensuring long life for the fireplace grate. These parts include the manifold 10, the inner and outer grate tubes 14 and 20, the baffle plate 28, the coals retaining strips 36, the back support plate 40, the front legs 42 and the back legs 44.

Since the inner tubes are provided to conduct hot air into the room, it is prudent to close off the open ends 24 of inner tubes 20 when starting a fire in a fireplace upon this grate, because at this stage of the fire, there is no hot air to conduct and it would be undesirable to pump cool air into the room. This is easily accomplished by moving the baffle plate 28 so that its openings 32 are not aligned with the inner tubes. Thus, at the fire starting stage all, or most, of the air from the blower is preferably directed through orifices 19 to feed the fire. Another reason for closing off the inner tubes with the baffle plate as the fire begins to build up, is that as the outer tubes 14 become warmer and start to heat the adjacent air, the inner tubes will be cooler. Since air will always seek the cooler passage, because the heated air expands and creates a back pressure, air will tend to flow into the room rather than pass out through the orifices, as needed for fire starting.

Once the fire is burning steadily and is creating coals, the variable speed blower 6, may be adjusted to allow it to burn faster or slower. Within the combustion zone in troughs 38, i.e. between the hot combustion surface of the fuel and the hot glowing surface of the coals, the radiation of these glowing surfaces is trapped. Into this zone, air preheated in the outer tubes 14 passes through the orifices 19 and is injected to provide oxygen and turbulence to burn fuel volatiles. These air jets produce cavities in the lower surfaces of the burning fuel which cavities may grow to several inches in diameter and act to further trap radiant heat. The cavities themselves become excellent local combustion devices because they act as black bodies, trapping radiation from the burning surface. Temperatures of over 1700 F are routinely measured in the combustion zone, while temperatures over 2000 F have been measured in the cavities. The elevated temperature, high turbulence and abundant supply of preheated air provide excellent combustion conditions for burning fuel volatiles quickly.

By virtue of the higher combustion zone temperatures achieved using my fireplace grate it will generate much more radiation heat into the room than a wood fire in a conventional fireplace. A combustion zone operating at 1800 F will radiate 2.7 times as much heat as a combustion zone operating at 1400 F because heat transfer from radiation increases with the fourth power of the temperature of the body providing the radiation. But rather than relying solely on radiant heat tranfer into the room, the present invention allows the user to control heated forced air flow into the room. As soon as the fire is burning steadily, the user may move the baffle plate 28 to orient the openings 32 to a position in front of the open ends 32 of the inner tubes, so that the open ends are partially or fully open, thereby controlling the amount of hot air allowed to flow into the room. The combustion zone heats the outer tube by conduction and convection which, in turn, heats the air passing in proximity to the outer tubes, by convection, to 500 F to 1000 F. The inner tubes are heated by a combination of conduction and convection by the heated air flowing over them and by their proximity to the heated outer tubes. The air passing through the inner tubes is heated by conduction as it flows therethrough. Depending on the amount of baffle plate opening and the blower rate, the air exiting to the room can be in the range of 200 F to 600 F.

Figure 6:
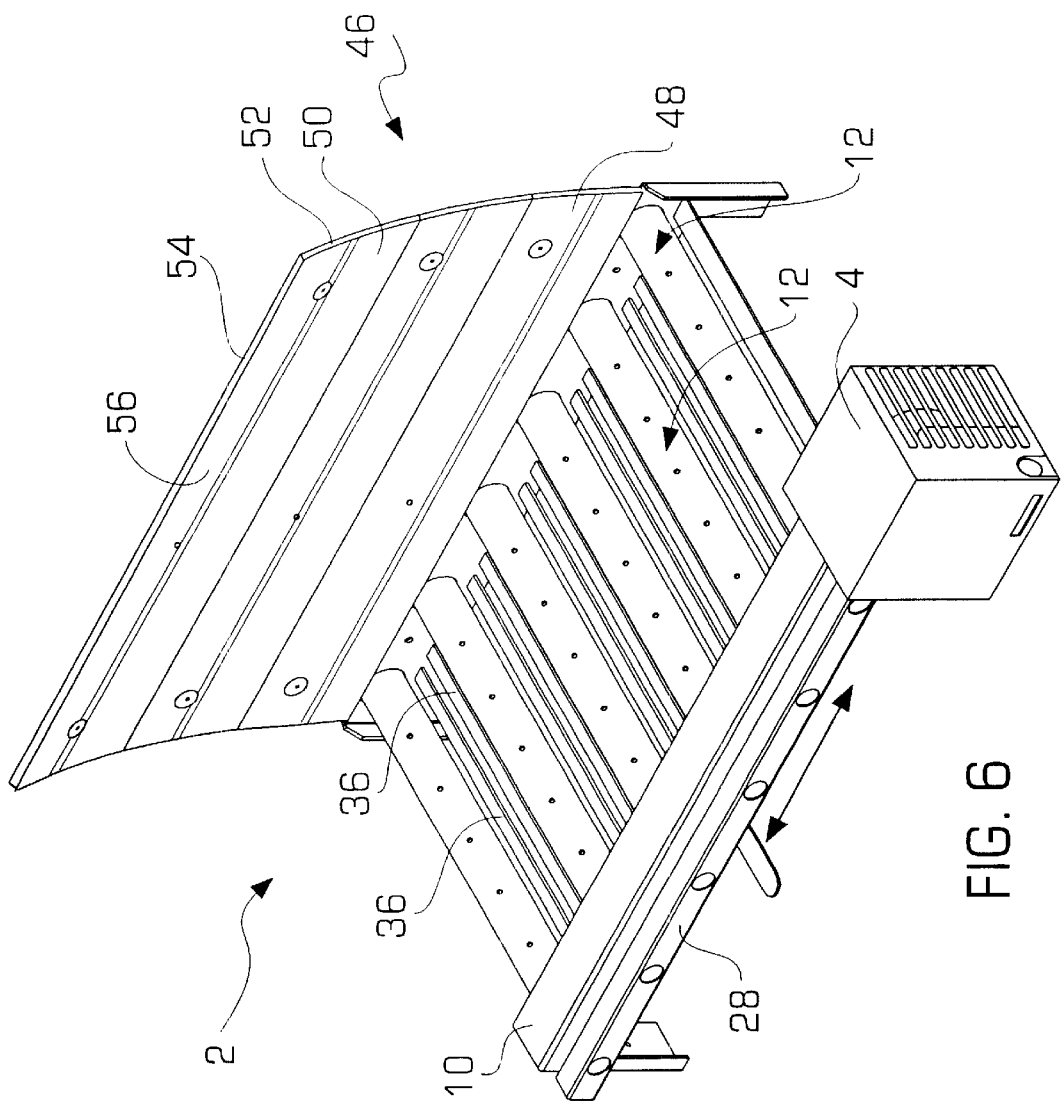
FIG. 6 is a perspective view of the improved fireplace grate in combination with a low thermal mass radiant energy heat reflector.

The improved fireplace grate of the present invention can advantageously be used in combination with my '830 patented design to take advantage of the increased radiant heat that normally leaks from the combustion zone. As shown in FIG. 6, a heat reflector 46 is mounted directly onto the grate, however, it should be understood that it may be self supported on its own feet. The shape of the heat reflector is uniquely designed to reflect the radiant heat immediately above the rear of the fire directly back into the combustion zone, making the fire burn hotter and more pollution free, and to reflect the majority of radiant heat rising above the combustion zone into the room. It comprises two distinct portions. Its lower third is a heat pumping section 48, extending vertically above the grate, and its upper two thirds, which is substantially tangent to the heat pumping section, is a heat reflecting section 50 having a radius of curvature of about 33 inches, the radius of curvature being selected to maximize the amount of radiant energy reflected from the fire into the room. It comprises a laminar structure including a structural support layer 52 which gives it its shape and strength, an insulating layer 54 and a low thermal mass reflecting layer 56. The low thermal mass reflecting layer is made thin so as to heat immediately upon receiving radiant energy from the fire and reradiate almost all of the heat back into the fire and into the room with little loss into the structural layer and into the fireplace walls.

A fireplace grate incorporating a heat reflector 46 mounted at the rear of the grate will thus heat the room in a threefold manner: first, it will reflect heat back into the fire to cause the fire to burn even hotter, thereby radiating more heat into the room; second, it will blow heated air into the room through inner tubes 20; and third, it will reflect heat by means of the reflector, back into the room.

What is claimed is:

1. An improved grate for the efficient burning of solid fuel and for forcing heated air therethrough and out therefrom, said grate comprising a plurality of substantially parallel, first tubular members defining a first generally planar surface for supporting the lower surface of solid fuel, each of said first tubular members having an open end and a closed end, a plurality of interior tubular members, supported within and in axial alignment with said first tubular members, each of said interior tubular members being open at both ends and having a first open end for receiving air from within said first support member and a second open end for transferring air out of said grate, a plurality of substantially parallel second support members defining a second generally planar support surface located below said first surface, said second support members being located between alternate ones of said first support members and defining, in combination with said first support members, a plurality of troughs for supporting glowing coals, a multiplicity of orifices extending through each of said first support members, each orifice being directed toward said first planar surface for creating a zone of turbulence in one of said troughs beneath the lower surface of the solid fuel, a blower connected to said first tubular members for moving air into said open ends of said first tubular members, through said orifices and through said interior tubular members.

2. The improved grate as defined in claim 1, wherein said second support members comprise spaced bars through which ashes may fall.

3. The improved grate as defined in claim 1, further including a heat reflector comprising a first portion for absorbing radiant energy from the combustion zone and reradiating thermal energy back into the combustion zone, and a second portion for absorbing radiant energy from the combustion zone and reradiating thermal energy over and beyond the fireplace grate.

4. The improved grate as defined in claim 3, wherein said heat reflector is mounted upon said grate.

5. The improved grate as defined in claim 4, wherein said first portion is located beneath said second portion and comprises about one-third of the height of said heat reflector, and said second portion comprises about two-thirds of the height of said heat reflector.

6. The improved grate as defined in claim 5, wherein said second portion is curved and said first portion is planar and is tangent to said curved second portion.

7. The improved grate as defined in claim 5, wherein the radiating surfaces of said first and second portions comprises a low thermal mass material.

8. The improved grate as defined in claim 7, wherein said low thermal mass material comprises a thin sheet of stainless steel.

9. The improved grate as defined in claim 5, wherein said first and second portions each comprise a laminar structure including a structural support layer, a thermal insulating layer located adjacent to said support layer, and a low thermal mass reflecting layer for radiating thermal energy located adjacent to said insulating layer.

10. The improved grate as defined in claim 1 wherein said blower is connected to said first tubular members via a manifold extending transversely to the axes of said first tubular members.

11. The improved grate as defined in claim 10 further including a baffle supported by said manifold for movement transversely to the axes of said interior tubular members, said baffle having openings therein which in a first position of said baffle are in axial alignment with said second open ends of said interior tubular members to allow air to flow out of said grate, and which in a second position of said baffle are out of alignment with said second open ends so that said baffle blocks the flow of air out of said grate through said open ends.

12. The improved grate as defined in claim 11, further including a handle connected to said baffle for moving it from said first position to said second position.

13. The improved grate as defined in claim 10, further including an end supporting element, and wherein said first tubular members are permanently secured in said manifold and said ends of said first tubular members remote from said manifold are supported for axial sliding movement within said end supporting element.

14. The improved grate as defined in claim 10, further comprising a speed controller connected to said blower whereby said blower is capable of being operated at various speeds during the burning of solid fuel so that the rate of combustion of the fuel may be controlled.

15. The improved grate as defined in claim 10 wherein said orifices are disposed in each of said first tubular members on opposite sides of a vertical plane passing through the axis of each of said first tubular members.

16. The improved grate as defined in claim 15, wherein said orifices of adjacent ones of said first tubular members are staggered relative to one another, whereby zones of turbulent air may be established in said troughs.

17. The improved grate as defined in claim 10, wherein said orifices are disposed at an angle in the range from 0 degrees to 60 degrees from the vertical.

18. The improved grate as defined in claim 10, wherein said orifices have a diameter larger than 3/32 inch and smaller than 3/8 inch.

* * * * *